(12) United States Patent
Seberger

(10) Patent No.: US 7,556,238 B2
(45) Date of Patent: Jul. 7, 2009

(54) EMERGENCY SHUTDOWN SYSTEM

(75) Inventor: Stephen G. Seberger, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 69 days.

(21) Appl. No.: 11/185,054

(22) Filed: Jul. 20, 2005

(65) Prior Publication Data

US 2007/0018127 A1 Jan. 25, 2007

(51) Int. Cl.
*F16K 31/02* (2006.01)
(52) U.S. Cl. .................. 251/69; 251/70; 251/129.04
(58) Field of Classification Search .......... 251/129.04, 251/68, 69, 70, 129.15
See application file for complete search history.

(56) References Cited

U.S. PATENT DOCUMENTS

| | | |
|---|---|---|
| 2,466,375 A | 4/1949 | Carbon |
| 3,665,945 A | 5/1972 | Ottenstein |
| 3,747,620 A * | 7/1973 | Kah, Jr. ............... 137/119.03 |
| 3,952,759 A | 4/1976 | Ottenstein |
| 4,174,729 A | 11/1979 | Roark et al. |
| 4,911,192 A | 3/1990 | Hartfiel et al. |
| 5,197,328 A | 3/1993 | Fitzgerald |
| 5,198,973 A | 3/1993 | Steutermann |
| 5,431,182 A | 7/1995 | Brown |
| 5,434,774 A | 7/1995 | Seberger |
| 5,651,385 A | 7/1997 | Karte |
| 5,654,885 A | 8/1997 | Mayhew et al. |
| 5,665,898 A | 9/1997 | Smith et al. |
| 5,684,451 A | 11/1997 | Seberger et al. |
| 6,089,269 A * | 7/2000 | Essam ................ 137/624.15 |
| 6,186,167 B1 | 2/2001 | Grumstrup et al. |
| 6,591,920 B1 | 7/2003 | Foppe |
| 6,920,409 B2 * | 7/2005 | Essam ..................... 702/114 |

FOREIGN PATENT DOCUMENTS

| | | |
|---|---|---|
| CN | 1342252 | 3/2002 |
| CN | 1463395 | 12/2008 |
| WO | WO-02/082193 A2 | 10/2002 |
| WO | WO-02/082199 | 10/2002 |

OTHER PUBLICATIONS

Patent Abstracts of Japan, Pub. No. 08193502 (1996).
International Search Report received in International (PCT) Application PCT/US2006/026534, by the European Patent Office, dated Jan. 22, 2007.
Written Opinion for Application PCT/US2006/026534, by the European Patent Office, dated Jan. 22, 2007.
Office Action for Chinese Patent Application No. 100680026691.6, issued Jan. 6, 2009.

* cited by examiner

*Primary Examiner*—John K Fristoe, Jr.
(74) *Attorney, Agent, or Firm*—Marshall, Gerstein & Borun LLP

(57) ABSTRACT

An emergency shutdown system includes an emergency shutdown valve, a control line to carry a signal determinative of positioning of the emergency shutdown valve, a solenoid assembly coupled to the control line to effectuate the positioning of the emergency shutdown valve, and a junction device coupled to the control line and the solenoid assembly. In some embodiments, the junction device includes a switch, such as a relay, responsive to the signal to control whether the solenoid assembly is coupled to the control line and, therefore, energized.

26 Claims, 2 Drawing Sheets

EMERGENCY SHUTDOWN SYSTEM

BACKGROUND OF THE DISCLOSURE

1. Field of the Disclosure

Figure 1:
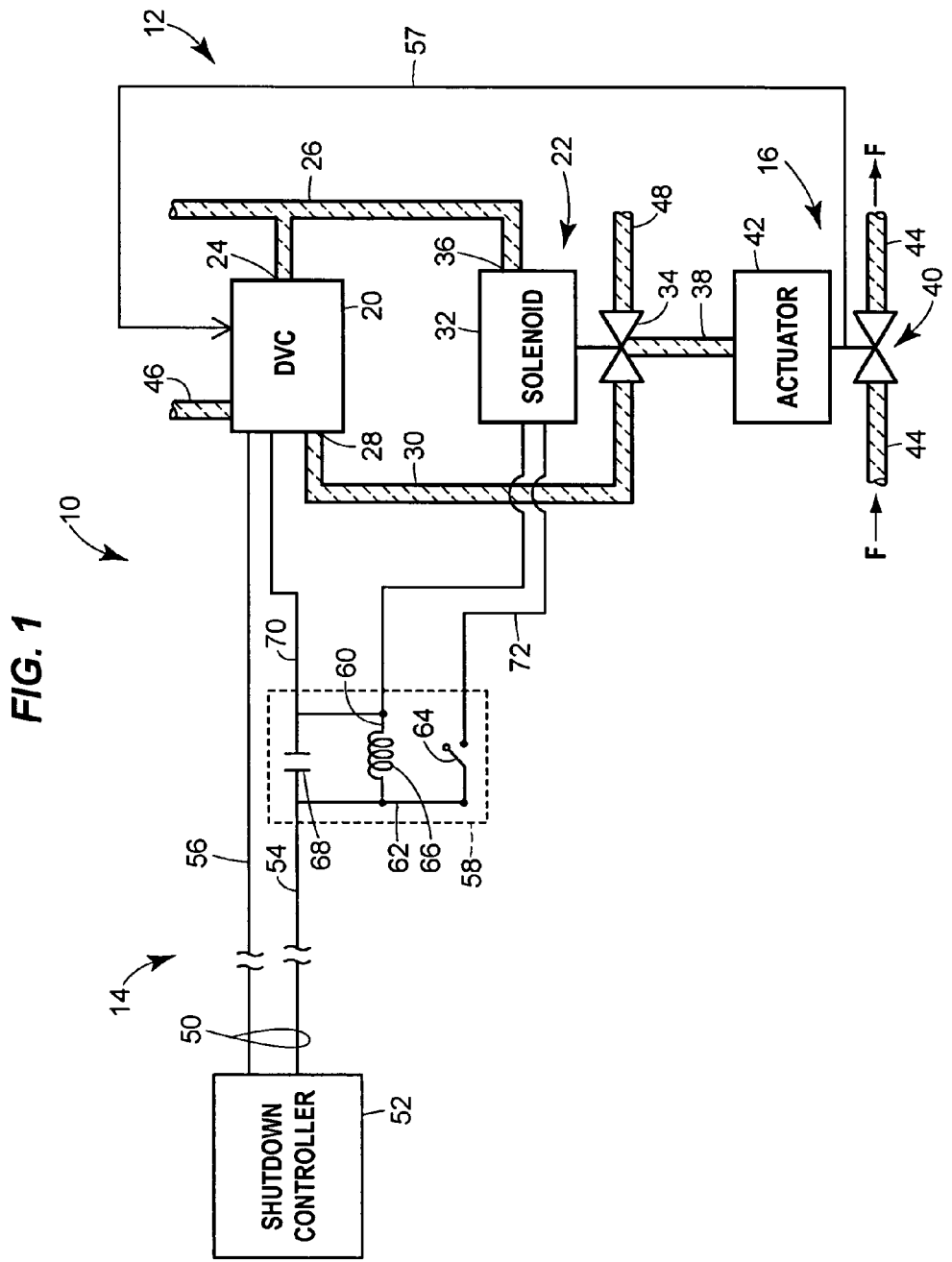

The present disclosure relates generally to process control systems and, more particularly, to emergency shutdown systems used in process control systems.

2. Brief Description of Related Technology

Industrial process control systems generally incorporate an emergency shutdown system to transition a shutdown valve to a safe state in the event of a device failure, power failure or other emergency. The emergency shutdown system is often configured such that the safe state is a default position or state for the shutdown valve. In this way, the safe state is reached in spite of an emergency that cuts power to the shutdown system or one of its components. For example, the shutdown valve may travel to the fully open or closed position to reach the safe state, while under normal operating conditions it remains fully closed or open (i.e., the normal state).

A basic emergency shutdown system includes a shutdown controller and a solenoid valve to actuate the shutdown valve. The solenoid valve provides the only mechanism to transition the shutdown valve to the safe state, and human observation is the only means to confirm the position of the shutdown valve during transitions between the normal and safe states, as well as during test procedures.

An improved emergency shutdown system includes a shutdown controller, a solenoid valve, and a valve positioner, such as a Digital Valve Controller (DVC). The solenoid valve provides one mechanism to transition the shutdown valve to the safe state, while the DVC monitors and confirms the position of the shutdown valve during transitions between the normal and safe states, as well as during test procedures. The DVC also provides a second, redundant mechanism to transition the shutdown valve to the safe state. Reliability of the shutdown system is improved relative to the basic, single solenoid implementation due to the capabilities of (i) conducting and monitoring tests of the shutdown valve, and (ii) redundantly operating the valve.

In a system with both a solenoid and a DVC, the shutdown controller typically controls the solenoid valve and the DVC via two, separate current loops. The redundancy of two, separate current loops enables the shutdown controller (and the rest of the process control system) to enable a transition to the safe state by cutting power in the first loop to the solenoid valve, while still digitally communicating with the DVC via the other loop. Unfortunately, the capability of monitoring that transition comes at the expense and complexity of installing, maintaining and operating the separate, additional loop for the DVC.

SUMMARY OF THE DISCLOSURE

In accordance with one aspect of the disclosure, an emergency shutdown system includes an emergency shutdown valve, a control line to carry a signal determinative of positioning of the emergency shutdown valve, a solenoid assembly coupled to the control line to effectuate the positioning of the emergency shutdown valve, and a junction device coupled to the control line and the solenoid assembly. The junction device includes a switch responsive to the signal to control the solenoid assembly.

In some embodiments, the emergency shutdown system further includes a digital valve controller to monitor the positioning of the emergency shutdown valve. The junction device may then further include a low impedance AC bypass path around the switch to support communications on the control line from the digital valve controller. The switch may then include a relay, and the low impedance AC bypass path may include a capacitor connected in parallel across a coil of the relay. In operation, a contact of the relay may then open to cut off current flow to the solenoid assembly when the signal in the control line falls to or below a threshold DC current value.

In these and other embodiments, the switch and the solenoid assembly may be connected as parallel loads to which the signal is provided such that the solenoid assembly is de-energized even when the switch fails to open in response to the signal.

In accordance with another aspect of the disclosure, an emergency shutdown system includes an emergency shutdown valve and a control line to carry a current signal that determines whether the emergency shutdown valve is held in a first state or a second state. A solenoid assembly controls actuation of the emergency shutdown valve from the first state to the second state in accordance with the current signal, and a relay couples the solenoid assembly to the control line to control the solenoid assembly in accordance with the current signal.

In some cases, the emergency shutdown system further includes a capacitor connected in parallel across a coil of the relay to support digital communications via the control line. The emergency shutdown system may then further comprise a digital valve controller coupled to the control line such that the digital communications comprise information transmitted from the digital valve controller indicative of positioning of the emergency shutdown valve during a partial stroke test. The digital valve controller may be responsive to the current signal to control the actuation of the emergency shutdown valve to provide redundancy in driving the emergency shutdown valve from the first state to the second state.

Alternatively, or in addition, the relay includes a contact that opens when the current signal falls to or below a threshold value to cut off current flow to the solenoid assembly. The coil of the relay and the solenoid assembly may be connected as parallel loads to which the current signal is provided such that the solenoid assembly is de-energized even if the contact fails to open when the current signal falls to or below the threshold value.

In accordance with yet another aspect of the disclosure, an emergency shutdown system includes an emergency shutdown valve, a control line to carry a signal determinative of positioning of the emergency shutdown valve, a valve positioner coupled to the control line and responsive to the signal to effectuate the positioning of the emergency shutdown valve, a junction device coupled to the control line, and a solenoid assembly connected to the control line via the junction device and configured to effectuate the positioning of the emergency shutdown valve in accordance with the signal.

In some embodiments, the junction device includes a relay and a capacitor connected to the control line in parallel with a coil of the relay. A contact of the relay may open to cut off current flow to the solenoid assembly when the signal in the control line falls to or below a threshold DC current value. A coil of the relay and the solenoid assembly may be connected as parallel loads to which the signal is provided such that the solenoid assembly is de-energized even if the contact fails to open when the signal in the control line falls to or below the threshold DC current value.

Alternatively, the junction device includes a resistor connected in parallel with the solenoid assembly.

In accordance with another aspect of the disclosure, an emergency shutdown system includes an emergency shutdown valve, a control line to carry a DC current having a level determinative of positioning of the emergency shutdown valve, a load coupled to the control line and having an impedance to the DC current across which a voltage is developed, and a solenoid assembly responsive to the voltage and coupled to the control line and the load to effectuate the positioning of the emergency shutdown valve in accordance with the DC current level.

The solenoid assembly may be connected in parallel with the load. Alternatively, or in addition, the emergency shutdown system may further include a digital valve controller coupled to the control line in series with the load.

In some embodiments, the load includes a relay coil. Alternatively, the load includes a resistor.

In some cases, the load includes a valve positioner coupled to the control line and responsive to the DC current level to effectuate the positioning of the emergency shutdown valve. The valve positioner may be connected in series with the solenoid assembly or, alternatively, in parallel with the solenoid assembly.

BRIEF DESCRIPTION OF THE DRAWING FIGURES

For a more complete understanding of the disclosure, reference should be made to the following detailed description and accompanying drawing figure, in which like reference numerals identify like elements, and in which:

FIG. 1 is a schematic representation of an emergency shutdown system in accordance with an exemplary embodiment of the disclosure; and, FIGS. 2-5 are schematic representations of alternative control sections of emergency shutdown systems in accordance with other exemplary embodiments of the disclosure.

While the disclosed system is susceptible of embodiments in various forms, there are illustrated in the drawing (and will hereafter be described) one or more specific embodiments, with the understanding that the disclosure is intended to be illustrative, and is not intended to limit the scope of the appended claims to the specific embodiments described and illustrated herein.

DETAILED DESCRIPTION OF PREFERRED EMBODIMENTS

Disclosed herein is an emergency shutdown system that generally provides for the reliable positioning of an emergency shutdown valve without having to utilize multiple current loops. To this end, certain embodiments of the system include a junction device or, more generally, a load impedance, for operation of both a solenoid assembly and a valve positioner, such as a digital valve controller, each of which may be used in connection with driving the shutdown valve to the safe state. In some embodiments, the solenoid assembly may constitute the primary mechanism for effectuating the positioning of the shutdown device. Despite being disposed along the same current loop, the digital valve controller adds reliability by providing testing capabilities and by monitoring the positioning of the shutdown valve to confirm that the safe position is reached. Moreover, the digital valve controller (or other positioner) may then be used to provide redundancy in valve control and pneumatic actuation. In these ways, the digital valve controller acts as a backup or secondary mechanism for effectuating the positioning of the shutdown valve.

The junction device supporting such reliability and redundancy enables both the solenoid assembly and the digital valve controller to be controlled by the same control signal, albeit indirectly in some cases, as described below. As a result, the system requires only a single cable pairing, or process control loop, such that the aforementioned reliability and redundancy are provided without the disadvantages of having separate cabling for the solenoid assembly and digital valve controller, respectively.

As described below, in some embodiments, the junction device couples or connects the solenoid assembly and the digital valve controller to the single cable pairing in a failsafe, or fault-tolerant, manner. That is, all known failure modes of the junction device (and its constituent parts or components) result in the shutdown valve being driven to the safe state. For this reason, the junction device may be referred to herein as a safety circuit.

The safety circuit is designed to operate within the standard 4-20 mA DC current control signal framework commonly used in process control systems. However, in some embodiments, the safety circuit is also configured to support digital communications based on any one or more of the process control digital protocols, such as HART, Profibus, Fieldbus, etc.

Although well suited for, and described herein in connection with, an emergency shutdown context, the disclosed system is not limited to any one application or context. Rather, the disclosed system may be applied in any context in which the operation of a valve benefits from reliable control or monitoring, and in which circumstances render the utilization of multiple, dedicated control loops to support the redundant control or monitoring impracticable. Such circumstances include, for instance, when the valve is separated from other components of the system by long distances, or when the operational environment is insecure or otherwise not conducive to maintaining multiple wired connections between the valve and a control area.

With reference now to the drawing figures, FIG. 1 illustrates an emergency shutdown system in accordance with an exemplary embodiment and indicated generally at 10. The emergency shutdown system 10 includes a pneumatic section indicated generally at 12 and a control section indicated generally at 14 that cooperate to provide reliable shutdown control of a shutdown valve assembly indicated generally at 16. Generally speaking, the emergency shutdown system 10 includes redundant mechanisms for effectuating the transition of the shutdown valve assembly 16 to the safe state. The emergency shutdown system 10 may operate in conjunction with, or as part of, a process control system (not shown) having one or more controllers or operator workstations in communication with one or more components of the disclosed system.

The pneumatic section 12 includes a digital valve controller (DVC) 20 fluidly coupled to the shutdown valve assembly 16 through a solenoid valve assembly indicated generally at 22. The DVC 20 receives pneumatic supply pressure at a DVC pressure input 24 from a supply conduit 26. A DVC pressure output 28 provides the pneumatic supply pressure to the solenoid valve assembly 22 via an output conduit 30. The solenoid assembly 22 includes a solenoid valve actuator 32 that drives a solenoid valve 34 using pneumatic supply pressure received at an actuator input 36 to which the supply conduit 26 is coupled. The solenoid valve 34 acts on pneumatic pressure from the DVC 20 through the output conduit 30 to supply pneumatic pressure to the shutdown valve assembly 16 through a safety valve supply conduit 38. The solenoid valve assembly 22 may include a pilot operated valve such as an ASCO® 3/2-4/2 series IS Piezo Operator valve manufactured by ASCO Valve Inc. (Florham, N.J.). More generally, the operation of the solenoid assembly 22 may be based on piezoelectric or electromagnetic transduction, or any other mechanism suitably responsive to the voltage or current signals applied thereto, as described below. In any event, the supply conduit 26 may provide common supply pressure to the devices within the pneumatic section 12, or may be individually plumbed to provide dedicated supply conduits to each of the devices.

The shutdown valve assembly 16 includes a safety valve 40 mechanically coupled to a safety valve actuator 42. In the exemplary embodiment of FIG. 1, the safety valve 40 is disposed along a fluid conduit or pipe 44. The safety valve 40 may be an air-to-close valve that prevents the flow of fluid, indicated by the arrow F, through the conduit 44 when sufficient pneumatic pressure is applied to the safety valve actuator 42. Specifically, the flow of fluid through the conduit 44 is prevented when the solenoid valve actuator 32 mechanically directs the solenoid valve 34 to route sufficient pneumatic pressure through the safety valve supply conduit 38 to the safety valve actuator 42. In response to the received pneumatic pressure, the safety valve actuator 42 closes the safety valve 40 to block the fluid flow through the conduit 44. This is an example of an emergency venting valve where the normal state blocks fluid flow in the conduit 44 with the actuator 42 pressurized to close the valve 40. Accordingly, the safe state allows fluid flow in the conduit 44 because the actuator 42 is vented to allow the valve 40 to open.

Alternatively, practice of the disclosed system may involve an air-to-open valve that is held open in the normal operating state to allow fluid flow, and held closed while in the emergency or safe state. In each of these cases, the safe state corresponds with the de-pressurized state of the safety valve actuator 42. However, as described and shown below in connection with a number of alternative embodiments, the disclosed system may involve a safe state in which pressure is applied to the safety valve actuator 42 rather than vented.

In the embodiment shown in FIG. 1, when the overall process control system and the emergency shutdown system 10 are held in the normal state (e.g., no emergency condition or testing), the DVC 20 routes pneumatic supply pressure from the supply conduit 26 through the DVC pressure output 28 to the solenoid valve 34. Concurrently, the solenoid valve actuator 32 positions the solenoid valve 34 to direct the pneumatic pressure in the output conduit 30 to the safety valve actuator 42. In this way, pneumatic pressure maintains the shutdown valve 40 in an open or closed position during the operation in the normal state with an air-to-open valve or an air-to-close valve, respectively.

In the event of an emergency, the supply of pneumatic pressure to the shutdown valve assembly 16 is removed. Specifically, the DVC 20 vents pneumatic pressure normally routed through the DVC pressure output 28 to low pressure through a DVC vent 46. The pressure in the output conduit 30 may also be vented as a result. In either case, the solenoid valve assembly 22 connects the valve supply conduit 38 to a solenoid valve vent 48, thereby venting the actuator 42 to low pressure. The shutdown valve 40 then closes to prevent fluid flow through the conduit 44 (in the exemplary case of an air-to-open valve) because the conduit 30 is no longer supplying pressure to the solenoid valve 34, as the solenoid valve 34 has placed the conduits 38 and 48 in fluid communication.

If a fault condition in the DVC 20 prevents the DVC 20 from venting the pneumatic pressure through the DVC vent 46, the solenoid valve actuator 32 may vent the safety supply conduit 38 and the safety valve actuator 42 through the solenoid valve vent conduit 48. On the other hand, if the solenoid valve actuator 32 fails to pneumatically switch the position of the valve 34, the DVC 20 directs the pneumatic supply pressure from the supply conduit 26 through the DVC vent 46 to effectuate a transition of the valve assembly 16. In these ways, the emergency shutdown system 10 provides redundant control of the venting of the pneumatic supply pressure normally provided via the supply conduit 26 to thereby transition the safety valve 40 to the safe state during an emergency.

The manner in which the control section 14 directs the above-described operation of the pneumatic section 12 is now set forth in connection with the exemplary embodiment of FIG. 1. The control section 14 includes cabling 50 (e.g., a home-run cable) to carry commands from a shutdown controller 52 to the DVC 20 and the solenoid assembly 22. Thus, in this embodiment, the control section 14 commands both the DVC 20 and the solenoid assembly 22 to effectuate positioning of the shutdown valve assembly 16, thereby providing redundant shutdown control. The cabling 50 may be a two-wire control loop comprising wires or lines 54, 56 that can support 4-20 mA DC control signals, as well as digital communications between the shutdown controller 52 and the DVC 20. For example, such communications may involve the transmission of valve position data from the DVC 20 to the shutdown controller 52. To that end, the DVC 20 receives an indication of the position of the shutdown valve assembly via a line 57 to monitor the operation thereof. And in this way, the DVC 20 acts as an intelligent positioner not limited to responding to the 4-20 mA control signal. One controller suitable for such intelligent monitoring and control is the DVC6000 digital valve controller commercially available from Fisher Controls International LLC (Marshalltown, Iowa), although practice of the disclosed system is not limited to any one particular digital communication protocol, digital valve controller, or digital communication technology. In fact, certain embodiments do not rely on any digital control or other functionality, as described below.

The control section 14 further includes a junction device or safety circuit 58 coupled to the cabling 50, the solenoid assembly 22, and the DVC 20. Because it is generally connected within the process control loop in series with the DVC 20, the junction device 58 provides one or more current paths for the conventional 4-20 mA DC current signal to provide both power and control functionality to the solenoid assembly 22 and the DVC 20. More specifically, the junction device 58 couples the solenoid assembly 22 to the cabling 50 and the shutdown controller 52, and also provides a communication path for the digital signals transmitted to and from the DVC 20. Digital communication is thus supported throughout operation, including during emergencies and test periods. With the junction device 58, the shutdown controller 52 may transmit control signals representative of a commanded valve position, as well as receive digital signals representative of information or data from the DVC 20. For example, the shutdown controller 52 may maintain a current level (e.g., 20 mA) for the DC control signal, while digitally commanding the DVC 20 to change the positioning of the shutdown valve assembly 16 to execute, for instance, a test procedure such as a partial stroke test. Test results from the partial stroke test can significantly increase the reliability of the emergency shutdown system. The disclosed system facilitates such testing by both enabling the partial stroke position test sequence and facilitating the collection and transmission of the test results.

The junction device 58 enables the same two-wire loop, i.e., the control lines 54, 56, to handle both the DC and AC (digital) control signals. To that end, the control lines 54, 56 may carry the digital signals superimposed on the DC current signal. The digital signal may conform to any desired communications protocol, such as the HART protocol. As described below, the nature of the junction device 58 allows such digital signals to be transmitted regardless of the level of the DC current signal, including when the DC current to the solenoid assembly 22 is inhibited either intentionally or for some other reason. In this way, if the solenoid assembly 22 or the components of the pneumatic section 12 or the control section 14 associated therewith fail to operate, digital communications with the DVC 20 may still be relied upon to confirm that the shutdown valve assembly 16 is in the safe state. More generally, the digital communications between the DVC 20 and the shutdown controller 52 (or other component of the process control system) may include or involve the transmission of status information regarding the position or other aspects of the shutdown valve assembly 16, such as alarm information, system DC current levels, communication status, or any other desired process or device parameter or characteristic supported by the communication protocol.

During operation in the absence of an emergency condition or an operational test, the shutdown controller 52 provides the DC current signal at the level indicative of the normal state, which may be 20 mA or any other desired level. The 20 mA DC current signal generally flows in a loop including the wires 54, 56, the DVC 20, the solenoid assembly 22, and the junction device 58. As described further below, the 20 mA current signal flows through this loop until being split at the junction device 58 into a first path 60 and a second path 62. Current flowing in the second path 62 passes through the solenoid assembly 22, while current in the first path 60 passes through a load in parallel with the solenoid assembly 22. In embodiments where the solenoid assembly 22 includes a piezoelectric control element, the voltage across the load in the path 60 determines whether the solenoid assembly 22 is energized. In other embodiments, where the solenoid assembly 22 includes a coil or other current-driven control element, the current divider formed by the paths 60 and 62 determines whether the solenoid assembly 22 is energized. In either case, the load in the path 60 has an impedance determinative of (i) the current flowing through the paths 60 and 62, and (ii) a voltage developed across the solenoid assembly 22.

In the embodiment of FIG. 1, the junction device 58 includes a relay having a relay contact 64 and a relay coil 66, which acts as the load in the path 60. The junction device 58 further includes a capacitor 68 connected in parallel with the relay coil 66. The capacitor 68 acts as a low impedance AC bypass path to support digital communications between the DVC 20 and the shutdown controller 52. In operation, a current level above a predetermined, threshold level through the cabling 50 (i.e., one of the lines 54, 56) causes the relay coil 66 to close the contact 64 such that current flows in the path 62 and through the solenoid assembly 22. In the exemplary embodiment described above with a piezoelectric control element in the solenoid assembly 22, the current flowing through the path 60 generates a sufficient voltage drop across the relay coil 66 such that the solenoid assembly is energized. For example, the relay may be selected such that the contact 64 is closed at a current level of about 18 mA, and where the resulting voltage drop across the relay coil 66 is about 6 volts DC or higher. The above-identified ASCO piezoelectric solenoid actuator 32 is then selected or configured such that the solenoid is energized at about the 6 volt level. In other, current-driven embodiments, the solenoid may be selected or configured to be driven at 2 mA. In either case, the 20 mA DC control signal provided by the shutdown controller 52 causes the junction device 58 to connect the solenoid assembly 22 to the cabling 50 and drive it accordingly.

When an emergency condition arises, the DC current control signal falls from the 20 mA level to, for instance, a 4 mA level. The relay is selected or configured such that its dropout point, i.e., the current at which the relay coil 66 is incapable of closing the contact 64, is above about 4 mA. The relay also is selected such that, at the dropout level above about 4 mA, the voltage across the relay coil 66 is below the voltage level necessary to energize the solenoid assembly 22. For instance, the solenoid assembly 22 may be selected or configured to de-energize at about 3 volts DC. In this way, the solenoid assembly 22 relaxes, thereby effectuating a transition to the safe state in response to the 4 mA DC control signal.

Of course, the voltages, currents and other circuit details are provided herein with the understanding that the values are exemplary in nature, and may be modified in alternative embodiments in accordance with the use of different circuit elements, system components, or control signal levels.

One advantage of the embodiment shown in FIG. 1 is that the junction device 58 operates in a fault-tolerant, or fail-safe, manner, in the sense that all known failure modes of the relay result in the solenoid assembly 22 becoming de-energized, thereby causing the shutdown valve assembly 16 to enter the safe state. One failure mode of the relay is that the contact 64 stays shut, i.e., fails to open, when the current signal in the cabling 50 falls to about 4 mA. In this failure mode, the 4 mA DC current flowing in the control line 54 or, equivalently, a line 70, does not result in sufficient voltage developed across the relay coil 66 to energize the solenoid assembly 22. In other words, the solenoid assembly 22 relaxes even when the contact 64 fails to open because the relay coil 66 and the solenoid assembly 22 are connected as parallel loads.

In another potential failure mode, the relay coil 64 could open during operation in the normal state. In this case, no current would flow through the path 60 and the relay contact 64 would open, such that no current would flow in a line 72 to the solenoid assembly 22, leading it to relax. As a result, entering this failure mode causes the shutdown valve assembly 16 entering the safe state. Conversely, if the relay coil 66 were to short, the voltage across the solenoid assembly 22 would be zero, such that, once again, the solenoid assembly 22 would relax. In each of these failure-mode cases, the result is that the shutdown valve assembly 16 enters the safe state.

Failures in the emergency shutdown system 10 outside of the junction device 58 will also take the system 10 to the safe state. For instance, in the event of a disruption in the cabling 50, zero current flows though the path 60, which causes the relay contact 64 to open. In this way, the solenoid assembly 22 is disconnected from the remainder of the system 10 and, as a result, de-energized.

FIGS. 2-5 present alternative embodiments of the disclosed emergency shutdown system. In each figure, only relevant portions of the control section are shown for ease in illustration. Generally speaking, these alternative embodiments include a load coupled to a control line that presents an impedance to the DC current flowing through the control line to develop a voltage applied to the solenoid assembly 22. In this way, the embodiments of FIGS. 2-5, like the exemplary embodiment of FIG. 1, allow the solenoid assembly 22 to be connected to the same control line as another positioner, such as the DVC 20.

Figure 2:
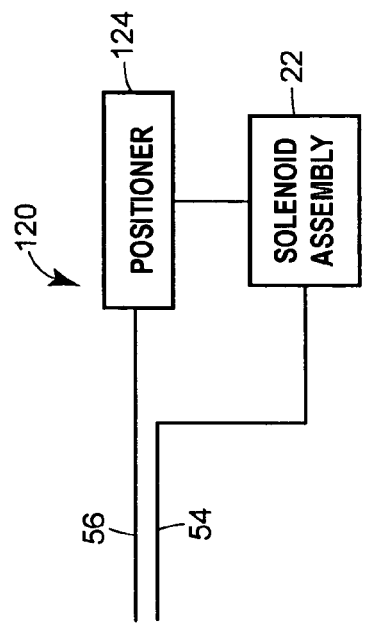

With reference now to FIG. 2, a control section indicated generally at 100 of an alternative emergency shutdown system includes the DVC 20 and the solenoid assembly 22, which may be configured in any suitable pneumatic arrangement, including, for instance, the arrangement shown in FIG. 1. The control section 100 further includes a junction device 102 coupling the solenoid assembly 22 to the control lines 54, 56 that carry the 4-20 mA current control signal. As in the embodiment of FIG. 1, the impedance provided by the junction device 102 is generally connected within the process control loop in series with the DVC 20. In this case, however, the junction device 102 does not include a switch device, such as the relay shown in FIG. 1. Rather, the junction device 102 includes a resistor 104 and a capacitor 106, each of which is connected in parallel with the solenoid assembly 22. In operation, the parallel loads presented by the resistor 104 and the solenoid assembly 22 cooperate to determine when the solenoid assembly 22 is energized. Thus, the embodiments of FIGS. 1 and 2 are also similar in the sense that both include a load, or impedance, across which the solenoid assembly 22 is connected in parallel for operation and control thereof. In this case, the resistor 104 is selected such that it presents an impedance to the DC current across which a voltage is developed. The solenoid assembly 22 is then responsive to the voltage across the resistor 104 to effectuate the positioning of the emergency shutdown valve assembly 16 (FIG. 1).

The DVC 20 may be replaced by a non-intelligent positioner in certain cases, such as when valve position monitoring is not important or pertinent. As a result, the capacitors 68, 106 may not be necessary. Such alternative embodiments may not provide quite the degree of reliability as the system shown in FIGS. 1 and 2. Nevertheless, the positioner replacing the DVC 20 still provides a redundant mechanism for effectuating the positioning of the shutdown valve assembly 16 (FIG. 1).

Figure 3:
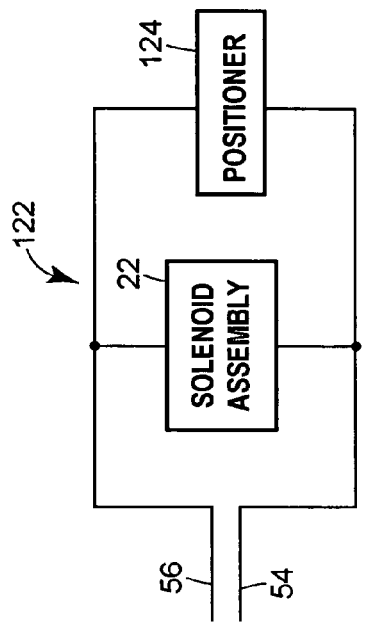

FIG. 3 illustrates yet another alternative embodiment of the disclosed system where a control section indicated generally at 110 of the emergency shutdown system includes a junction device 112 that couples the solenoid assembly 22 to one of the control lines 54, 56. In contrast to the embodiment shown in FIG. 2, the junction device 112 does not include a capacitor for support of digital communications with the DVC 20. However, the junction device 112 includes a resistor 114 having a resistance selected to minimize the attenuation of the digital communication signals between the DVC 20 and the shutdown controller 52 (FIG. 1). The resistance is also selected to support the control of the solenoid assembly 22, as described above in connection with the embodiments of FIGS. 1 and 2. As in those cases, the resistor 114 provides a load impedance across which a voltage is developed in connection with the DC current flowing in the control lines 54, 56. That voltage is then applied to the solenoid assembly 22 such that the solenoid assembly 22 effectuates the positioning of the emergency shutdown valve assembly 16 (FIG. 1) in accordance with the DC current level. As noted above, the DVC 20 may be replaced with a non-intelligent positioner if, for instance, the intended purpose is directed more so to actuation redundancy than valve position monitoring.

Figure 4:
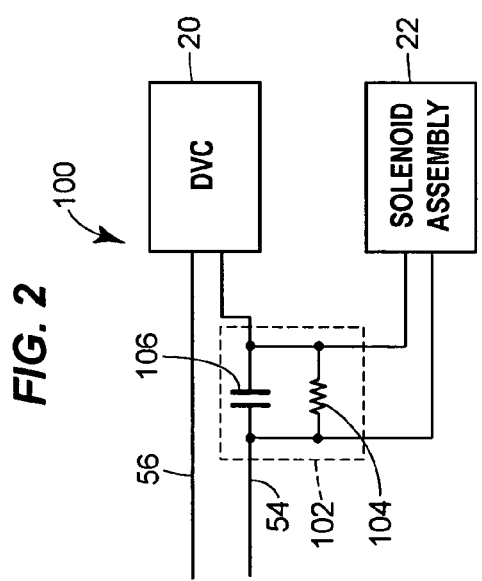
Figure 5:
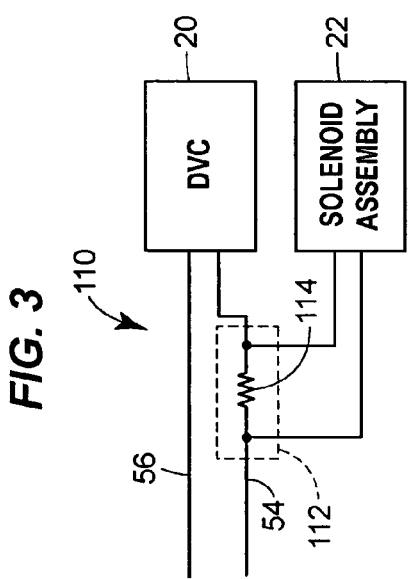

FIGS. 4 and 5 illustrate two additional alternative embodiments of the disclosed system, where the load coupled to the control lines 54, 56 that determines a voltage or current for driving the solenoid assembly 22 is the positioner itself providing the redundant actuation mechanism. Specifically, FIGS. 4 and 5 present alternative control sections 120 and 122, respectively, each of which includes a positioner 124. The positioner 124 is coupled to the solenoid assembly 22 either in series or in parallel in the two alternative embodiments. In each case, the varying level of the DC current control signal in the control lines 54, 56 modifies the voltage drop across the positioner 124. As a result, the solenoid assembly 22 experiences a varying voltage and/or current signal, which is then determinative of its operation to effectuate the positioning of the emergency shutdown valve assembly 16 (FIG. 1). The positioner 124 may be selected and/or configured such that the voltage drop across its effective impedance varies sufficiently between the 4 and 20 mA current levels to modify the operation of the solenoid assembly 22 accordingly. The solenoid assembly 22 may then be selected and/or configured in accordance with the voltage levels (or current levels) presented by the positioner 124.

In some cases, the positioner 124 may be a digital valve controller (DVC). To support digital communications the solenoid assembly 22 is then configured such that the digital communication signals between the DVC and the shutdown controller 52 (FIG. 1) are not too attenuated or otherwise negatively affected by the solenoid assembly 22.

In connection with any of the above-described embodiments, the disclosed system may include or incorporate alternative or additional pneumatic and mechanical elements to allow the solenoid valve actuator 32 and the DVC 20 to control the actuation of the safety valve assembly 16. In some cases, the disclosed system may also control the actuation of one or more additional shutdown valves.

As noted above, alternative embodiments of the disclosed system may include a pneumatic section arranged such that a transition to the safe state involves pressure applied to the safety valve actuator (rather than vented). To that end, the solenoid assembly may be configured to supply (rather than vent) air pressure when de-energized. It may then be useful, but not necessary, to correspond the safe state with a 20 mA DC control signal, and the normal state with a 4 mA DC control signal. In embodiments having a DVC, the DVC may accordingly be configured to supply air pressure in response to a 4 mA control signal. Despite the different pneumatic arrangement and DC current levels involved, the solenoid assembly and the DVC in these embodiments may still be controlled via the same current loop (i.e., the same wire pair or cabling). To that end, a junction device having a simple resistance or other impedance may provide higher reliability than embodiments having a relay, given the different current levels of the control signals. In either case, the solenoid assembly is still controlled via the voltage across an impedance in series with the DVC.

Further details regarding the operation of the disclosed shutdown system with other components of the process control system, including testing procedures for the shutdown system, may be found in U.S. Pat. No. 6,186,167 entitled "Emergency Shutdown System," the entire disclosure of which is hereby incorporated by reference herein.

While the present invention has been described with reference to specific exemplary embodiments, which are intended to be illustrative only and not to be limiting of the invention, it will be apparent to those of ordinary skill in the art that changes, additions and/or deletions may be made to the disclosed embodiments without departing from the spirit and scope of the invention. Accordingly, the foregoing description is given for clearness of understanding only, and no unnecessary limitations should be understood therefrom, as modifications within the scope of the invention may be apparent to those having ordinary skill in the art.

What is claimed is:

1. An emergency shutdown system, comprising:
   an emergency shutdown valve;
   a control line to carry a signal determinative of positioning of the emergency shutdown valve;
   a solenoid assembly coupled to the control line to effectuate the positioning of the emergency shutdown valve; and,
   a junction device coupled to the control line and the solenoid assembly and comprising a switch, wherein the signal determinative of positioning of the emergency shutdown valve determines whether the switch is in at least a first position or in a second position, wherein the switch is coupled to the solenoid assembly in a manner that causes the switch to control the solenoid assembly in response to the signal determinative of positioning of the emergency shutdown valve and drive the emergency shutdown valve to a safe state in a failure mode of the junction device.

2. The emergency shutdown system of claim 1, further comprising a digital valve controller to monitor the positioning of the emergency shutdown valve.

3. The emergency shutdown system of claim 2, wherein the junction device further comprises a low impedance AC bypass path around the switch to support communications on the control line from the digital valve controller.

4. The emergency shutdown system of claim 3, wherein the switch comprises a relay and wherein the low impedance AC bypass path comprises a capacitor connected in parallel across a coil of the relay.

5. The emergency shutdown system of claim 4, wherein a contact of the relay opens to cut off current flow to the solenoid assembly when the signal in the control line falls to or below a threshold DC current value.

6. An emergency shutdown system, comprising:
an emergency shutdown valve;
a control line to carry a signal determinative of positioning of the emergency shutdown valve;
a solenoid assembly coupled to the control line to effectuate the positioning of the emergency shutdown valve; and,
a junction device coupled to the control line and the solenoid assembly and comprising a switch, wherein the switch controls the solenoid assembly in response to the signal determinative of positioning of the emergency shutdown valve, so that the solenoid assembly drives the emergency shutdown valve to a safe state in a failure mode of the junction device; and wherein the switch and the solenoid assembly are connected in parallel to the control line so that the solenoid assembly is de-energized even when the switch fails to open in response to the signal.

7. An emergency shutdown system, comprising:
an emergency shutdown valve;
a control line to carry a current signal that determines whether the emergency shutdown valve is held in a first state or a second state;
a solenoid assembly that controls actuation of the emergency shutdown valve from the first state to the second state in accordance with the current signal;
a solenoid assembly control line to carry a signal to control the solenoid assembly; and,
a relay that couples the solenoid assembly to the control line through the solenoid assembly control line to control the solenoid assembly via the solenoid assembly control line in accordance with the current signal such that the solenoid assembly drives the emergency shutdown valve to a safe state in a failure mode of the relay.

8. The emergency shutdown system of claim 7, further comprising a capacitor connected in parallel across a coil of the relay to support digital communications via the control line.

9. The emergency shutdown system of claim 8, further comprising a digital valve controller coupled to the control line such that the digital communications comprise information transmitted from the digital valve controller indicative of positioning of the emergency shutdown valve during a partial stroke test.

10. The emergency shutdown system of claim 9, wherein the digital valve controller is responsive to the current signal to control the actuation of the emergency shutdown valve to provide redundancy in driving the emergency shutdown valve from the first state to the second state.

11. An emergency shutdown system, comprising:
an emergency shutdown valve;
a control line to carry a current signal that determines whether the emergency shutdown valve is held in a first state or a second state;
a solenoid assembly that controls actuation of the emergency shutdown valve from the first state to the second state in accordance with the current signal; and,
a relay that couples the solenoid assembly to the control line to control the solenoid assembly in accordance with the current signal such that the solenoid assembly drives the emergency shutdown valve to a safe state in a failure mode of the relay; and wherein the relay comprises a contact that opens when the current signal falls to or below a threshold value to cut off current flow to the solenoid assembly.

12. The emergency shutdown system of claim 11, wherein the coil of the relay and the solenoid assembly are connected in parallel to the control line so that the solenoid assembly is de-energized even if the contact fails to open when the current signal falls to or below the threshold value.

13. An emergency shutdown system, comprising:
an emergency shutdown valve;
a control line to carry a signal determinative of positioning of the emergency shutdown valve;
a valve positioner coupled to the control line and responsive to the signal to effectuate the positioning of the emergency shutdown valve;
a junction device coupled to the control line; and,
a solenoid assembly connected to the control line via the junction device and configured to effectuate the positioning of the emergency shutdown valve in accordance with the signal.

14. The emergency shutdown system of claim 13, wherein the junction device comprises a relay and a capacitor connected to the control line in parallel with a coil of the relay.

15. The emergency shutdown system of claim 14, wherein a contact of the relay opens to cut off current flow to the solenoid assembly when the signal in the control line falls to or below a threshold DC current value.

16. The emergency shutdown system of claim 15, wherein a coil of the relay and the solenoid assembly are connected in parallel to the control line so that the solenoid assembly is de-energized even if the contact fails to open when the signal in the control line falls to or below the threshold DC current value.

17. An emergency shutdown system, comprising:
an emergency shutdown valve;
a control line to carry a signal determinative of positioning of the emergency shutdown valve;
a valve positioner coupled to the control line and responsive to the signal to effectuate the positioning of the emergency shutdown valve;
a junction device coupled to the control line; and
a solenoid assembly connected to the control line via the junction device and configured to effectuate the positioning of the emergency shutdown valve in accordance with the signal; and wherein the junction device comprises a resistor connected in parallel with the solenoid assembly.

18. An emergency shutdown system, comprising:
an emergency shutdown valve;
a control line to carry a DC current having a level determinative of positioning of the emergency shutdown valve;

a load coupled to the control line and having an impedance to the DC current across which a voltage is developed; and a solenoid assembly coupled to the control line and the load to effectuate the positioning of the emergency shutdown valve in accordance with the DC current level, wherein the solenoid assembly is adapted to drive the emergency shutdown valve to a safe state in response to a particular level of the voltage.

19. The emergency shutdown system of claim 18, wherein the solenoid assembly is connected in parallel with the load.

20. The emergency shutdown system of claim 18, further comprising a digital valve controller coupled to the control line in series with the load.

21. The emergency shutdown system of claim 18, wherein the load comprises a relay coil.

22. The emergency shutdown system of claim 18, wherein the load comprises a resistor.

23. The emergency shutdown system of claim 18, wherein the load comprises a valve positioner coupled to the control line and responsive to the DC current level to effectuate the positioning of the emergency shutdown valve.

24. The emergency shutdown system of claim 23, wherein the valve positioner is connected in series with the solenoid assembly.

25. The emergency shutdown system of claim 23, wherein the valve positioner is connected in parallel with the solenoid assembly.

26. An emergency shutdown system, comprising:

an emergency shutdown valve;

a control line to carry a signal determinative of positioning of the emergency shutdown valve;

a solenoid assembly coupled to the control line to effectuate the positioning of the emergency shutdown valve; and, a junction device coupled to the control line and the solenoid assembly and comprising a switch, wherein the switch is adapted to control the solenoid assembly to drive the shutdown valve to a safe state; the switch being responsive only to the signal determinative of positioning of the emergency shutdown valve.

\* \* \* \* \*